Nov. 23, 1954  G. A. TINNERMAN III  2,695,046
CAGE NUT HAVING AUXILIARY SPRING LOCKING TONGUES
Filed Aug. 25, 1952

INVENTOR
GEORGE A. TINNERMAN, III

BY *H. G. Lombard*
ATTORNEY 2,695,046

CAGE NUT HAVING AUXILIARY SPRING LOCKING TONGUES

George A. Tinnerman III, Cleveland, Ohio, assignor to Tinnerman Products, Inc., Cleveland, Ohio, a corporation of Ohio Application August 25, 1952, Serial No. 306,085

2 Claims. (Cl. 151—41.75)

This invention relates in general to nut locking devices, and deals, more particularly, with improved simplified constructions for a nut lock in which a conventional nut is provided with an auxiliary sheet metal device comprising integral thread locking means having a normal free running fit on an associated bolt for quick and easy application to initially tightened position, and with said thread locking means effective in the final tightening operation to provide a pronounced positive locking action which prevents loosening or removal of the nut and bolt from applied position.

A primary object of the invention is to provide such a nut lock in the form of a shell or cage which fits over a conventional threaded nut and is provided with integral thread locking elements in the form of tongues or the like which are normally adapted for a free running threaded engagement with the thread on the bolt in phase with the thread of the nut such that the bolt and nut are easily and quickly advanced to initially tightened position, and with said tongues providing an automatic thread locking action with the bolt thread in the final tightening operation to lock the bolt and nut in fully applied position.

Another object of the invention is to provide a combined nut and nut lock of this character in which the sheet metal shell or cage is provided with integral thread locking tongues or the like together with means maintaining said tongues normally in phase with the thread in the nut for ready application thereof to initially tightened position on the associated bolt and without affecting the final tightening operation during which said tongues automatically effect a positive thread locking action with the bolt thread to lock the bolt and nut in fully applied position.

A further object of the invention is to provide a combined nut and nut lock of the kind described in which the sheet metal cage or shell is provided with integral thread engaging tongues or the like and resilient spring fingers supporting the nut within the shell with the thread in the nut in phase with said tongues for ready application thereof to initially tightened position on the associated bolt, and with said spring fingers being yieldable in the final tightening operation in a manner whereby the nut is tightened independently of the movement of said tongues into thread locking relation with the bolt thread to lock the bolt and nut in fully applied position.

Further objects and advantages, and other new and useful features in the construction, arrangement and general combination of elements of the invention will be readily apparent as the following description proceeds with reference to the accompanying drawings, for purposes of illustration but not of limitation, in which like reference characters designate like parts throughout, and in which.

Figure 5:
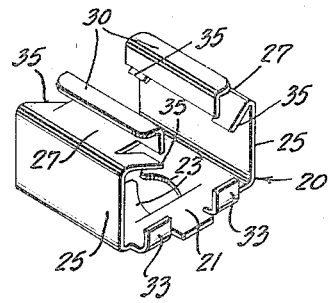
Figure 6:
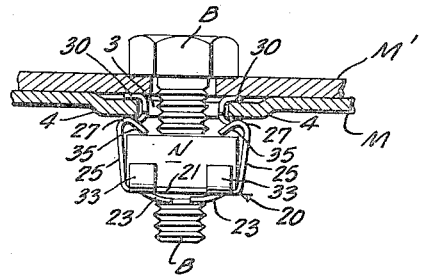

Fig. 5 shows a sheet metal shell or cage as provided in another form of the invention which is adapted to be attached in fastening position in an opening in a part to be secured; and, Fig. 6 is a vertical sectional view of an assembly in which a combined nut and nut lock embodying the sheet metal shell or cage of Fig. 5 is shown in fastening position preparatory to the final tightening of the associated bolt to secure the assembly.

Figure 1:
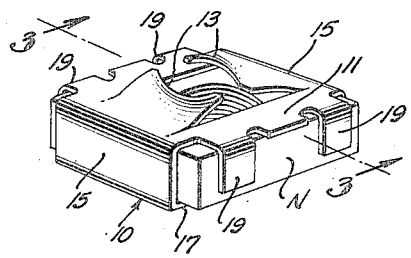
Fig. 1 is a perspective view of a combined nut and nut lock in accordance with the invention, showing the formation of the integral thread locking tongues on the top of the device.
Figure 2:
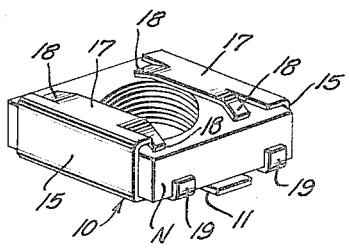
Fig. 2 is a perspective view, on a smaller scale, showing the underside of the device seen in Fig. 1, and illustrates the formation of the spring fingers for retaining the nut within the shell or cage with the thread in the nut in phase with the thread locking tongues on the top of the nut.

Referring now, more particularly, to the drawings, the combined nut and nut lock of the invention is shown comprising a sheet metal shell or cage, designated generally 10, which is fitted over and retained on a standard nut N having the usual threaded bolt receiving opening. The shell or cage 10 is constructed from suitable sheet metal of a spring metal nature such as spring steel or cold rolled steel having spring like characteristics. The sheet metal blank for forming the shell or cage 10 is of a size and configuration determined by the shape and size of the nut with which it is to be used and, of course, may be readily provided for use with any conventional threaded nut. In the present example, the sheet metal shell or cage 10 is shown as provided for use with a standard square nut N in a manner whereby the complete device is provided as a unitary combined nut and nut lock as shown in Figs. 1 and 2.

The sheet metal blank forming the shell or cage 10 is bent to define a central base or body portion 11 provided with a pair of tongues 13 or similar resilient thread engaging means stamped from the material of said base 11 and bent to project outwardly out of the plane of said base. The thread locking tongues or similar thread engaging elements 13 may be provided in various forms and have been found most effective when provided from the sheet metal material of the base or body portion 11 by an aperture intermediate spaced parallel slits which form the cooperating tongues 13 or the like having spaced extremities defining a thread or thread opening corresponding substantially to the root of the bolt B to be employed for threadedly engaging the thread on said bolt. The tongues 13 are formed to project out of the plane of the base or body 11 and are bent lengthwise in substantial ogee formation to provide for increased strength in the length thereof while the extremities thereof are shaped to lie on a helix corresponding to the helix of the thread on the bolt for uniform threaded engagement therewith. Such tongues 13 are possessed of unusual inherent strength and will not collapse or pull through the base 11 when the associated bolt is tightened therewith, nor loosen under continuous strain or vibration in the installation. This takes place by reason of the fact that the sheet metal material from which such tongues 13 are formed is of less thickness than the pitch or spacing between adjacent thread convolutions on the bolt wherefore, the extremities of said tongues 13 move toward each other and cut into the grooves intermediate adjacent thread convolutions on the bolt when tightened, and otherwise become embedded in the root of the bolt in locked fastening engagement therewith.

Figure 3:
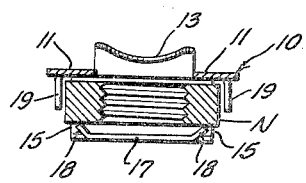
Fig. 3 is a vertical sectional view of the combined nut and nut lock shown in Fig. 1, as seen along line 3—3, looking in the direction of the arrows; and, Fig. 4 is a vertical sectional view of an assembly showing the combined nut and nut lock in Figs. 1–3, inclusive, as applied to tightened fastening position on an associated bolt to secure the assembly.

At each side of the central base or body portion 11, similar end portions of the blank are bent to extend in the same general direction to provide a pair of side arms 15 carrying inturned flanges 17 extending inwardly toward each other at the underside of the nut N. As seen in Fig. 3, the side arms 15 have a height greater than the thickness of the nut N such that the nut is adapted for movement upwardly and downwardly within the shell or cage 10 between the base 11 and the inturned flanges 17. The inner ends of the inturned flanges 17 are provided with partial slits at each side to define transversely extending spring fingers 18 which are bent inwardly to engage and support the bottom of the nut N in spaced relation to the inturned flanges 17 and with the top of the nut adjacent the base or body portion 11. At each side of the base or body portion 11, one or more tabs 19, and preferably a pair of such tabs, as shown, are bent to extend downwardly from the side edges of the central base or body portion 11 in position to retain the nut N in assembled relation between the side arms 15 and inturned flanges 17 of the shell or cage 10.

Figure 4:
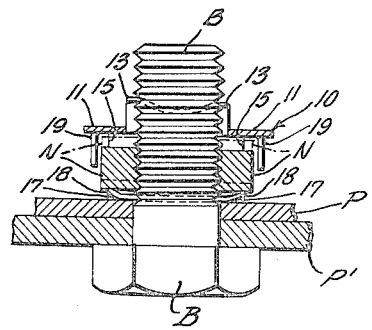

In the combined nut and nut lock thus provided, the arrangement is such that the spring fingers 18 engage and support the bottom of the nut N, as seen in Fig. 3, in a manner whereby the thread in said nut N is in phase with the thread defined by the extremities of the locking tongues 13. This provides for a free running fit of the combined nut and nut lock with the thread of the bolt B which permits the bolt and nut to easily be threaded and drawn up to finger tight position in the initial application of the bolt and nut to an assembly of parts to be secured. In the illustration of Fig. 4, the bolt B is received in aligned holes in the parts P, P' to be secured and the combined nut and nut lock 10 quickly threaded onto the bolt B to a finger tight position against the adjacent part P. In this relation, the nut N is supported by the extremities of the spring fingers 18 engaging the underside of the nut as seen in Fig. 3 such that the top of the nut is in its normal raised position adjacent the base 11 of the shell as shown in full lines in Fig. 3 and in broken lines in Fig. 4.

In the final tightening operation, turning of the bolt B draws up and moves the nut N toward the panel P, Fig. 4, independently of the shell or cage 10 which retains its initial shape except for compression of the spring fingers 18 under the tightened clamping force of the nut N and tensioning of the locking tongues 13 in locking relation with the bolt B.

The spring fingers 18 are compressed from their initial position shown in Fig. 3 to a more or less flattened condition shown in Fig. 4 under the clamping force of the nut N in tightened position. The adjacent lower ends of the side arms 15 bear upon the panel and support the base or body 11 of the shell or cage in fixed relation to the panel P, and likewise, the tongues 13 which are carried by said base 11 are also fixedly supported at their junctions with said base 11.

Inasmuch as the tongues 13 are fixedly supported at their junctions with the base 11, said tongues are movable only by their extremities in threaded engagement with the bolt B. Accordingly, as the bolt is turned to tighten the nut N, as aforesaid, the extremities of said tongues 13, in threaded engagement with the bolt, are compressed and necessarily move downwardly toward the base 11 and inwardly toward each other to cut into the root of the bolt and adjacent surfaces of the bolt thread to provide a positive thread lock of the tongues 13 with the thread of the bolt.

A simultaneous spring lock is provided as a result of the compressive force on the base 11 through the tongues 13 which produces a reverse upward spring force on the extremities of said tongues in threaded engagement with the bolt thread.

In addition, an added spring locking force is produced by the compressed spring fingers 18 which exert a constant upward spring force on the bottom of the nut N to produce a frictional thread lock of the thread surfaces in the nut N with the mated thread surfaces on the bolt B.

Figs. 5 and 6 show another form of combined nut and nut lock in accordance with the invention which comprises a nut locking means of the general character described with reference to Figs. 1–4, inclusive, together with means on the shell or cage 20 for attaching the device in fastening position in an assembling opening in a part to be secured preparatory to the application of the associated bolt for securing the part in an assembly. In this form of the invention, the shell or cage 20 has a generally similar construction comprising a central base or body portion 21 carrying similar locking tongues 23 provided from the material of said base portion 21 and projecting outwardly out of the plane of said base 21. End portions of the blank on opposite sides of the base or body portion 21 are bent to extend in the same general direction to define a pair of yieldable side arms or spring arms 25 extending in the same general direction and having opposing wall portions disposed in slightly outwardly inclined relation. The free end portions on said spring arms 25 are bent to provide inturned flanges 27 extending inwardly toward each other and merging into return bent outwardly extending hook elements 30. The said hook elements 30 are provided in a reduced width corresponding to the width of the panel opening 3 in the supporting part M. Preferably the marginal portion of said panel opening 3 in part M is provided with a depression or dimple 4 to accommodate the ends of the outwardly extending hooks 30 so that the adjoining part M' may be secured in flush relation thereto. The hook elements 30 are otherwise provided in a predetermined spacing from the inturned flanges 27 corresponding substantially to the thickness of the part M adjacent the panel opening 3 so as to clasp opposing marginal portions of said panel opening 3 in snug frictional engagement therewith. Preferably the side arms 25 extend from the central base or body portion 21 in an entirely free and independent relation so that they may be readily flexed as necessary for an easy and quick attachment of the hooks 30 with the edges of the panel opening 3. The shell or cage 20, thus provided, is completed by one or more tabs 33 bent to extend downwardly from each of the side edges of the central base or body portion 21 in position to retain the nut N in assembled relation within the shell or cage 20.

The arrangement, otherwise, is such that the side arms 25 have a height greater than the thickness of the nut N, as seen in Fig. 6, such that the nut is adapted for movement upwardly and downwardly within the shell or cage 20 between the base 21 and the inturned flanges 27. The inner ends of the inturned flanges 27 are provided with partial slits extending from the ends of said flanges inwardly thereof in a manner to define lengthwise spring fingers 35 which are bent inwardly to engage and support the bottom face of the nut N in spaced relation to said inturned flanges 27, and with the top of said nut adjacent the base or body portion 21.

The fastening device, thus provided, is easily and quickly attached in the panel opening 3 in part M simply by compressing the outwardly inclined opposing wall portions of the side arms 25 to move the hooks 30 on the ends thereof inwardly toward each other. In this relation, the hooks 30 still have their extremities farther apart than the width of the panel opening 3. Accordingly, in attaching the nut holder, one hook is passed through the panel opening 3 with the other hook resting on the face of the panel M adjacent said opening 3. The clearance between the sides of the nut N and the side arms 25 enables the latter hook to be pressed inwardly and sprung sufficiently so that it may also pass through the panel opening 3 and thus be received in said opening. The side arms 25 are then released from their compressed condition and in attempting to assume their normal outwardly inclined relation, both hooks 30 are forced to spread apart and thereby frictionally and grippingly engage the adjacent marginal edges of the panel opening 3, as shown in Fig. 6, to retain the fastening device in attached position on the part M. The arms 25, as thus attached, do not assume their normal untensioned relation but rather, remain biased slightly inwardly in the engaged position of the hooks 30 as illustrated in Fig. 6.

In such attached position of the fastening device, the spring fingers 35 engage and support the adjacent face or bottom of the nut N in a manner whereby the thread in said nut N is in phase with the thread defined by the extremities of the locking tongues 23. This provides for a free running fit of the combined nut and nut lock with the thread of the bolt B which permits the bolt to be easily and quickly applied and drawn up to initially tightened position, as shown in Fig. 6.

In the final tightening operation, turning of the bolt B draws up and moves the nut N toward the panel M independently of the shell or cage 20 which retains its initial shape except for compression of the spring fingers 35 under the tightened clamping force of the nut N and tensioning of the locking tongues 23 in locking relation with the bolt B. The spring fingers 35 are compressed from their initial position shown in Fig. 6 to a more or less flattened condition under the clamping force of the nut N in tightened position. The adjacent lower ends of the side arms 25 bear upon the panel M and support the base or body 21 of the shell in fixed relation, and likewise, the tongues 23 which are carried by said base 21, are also fixedly supported at their junctions with said base 21 such that said tongues 23 are movable only by their extremities in threaded engagement with the bolt B. Accordingly, as the bolt B is turned to tighten the nut N, as aforesaid, the extremities of said tongues 23, in threaded engagement with the bolt, are compressed and necessarily move toward the base 21 and inwardly toward each other to cut into the root of the bolt and adjacent surfaces of the bolt thread to provide a positive thread lock of the tongues 23 with the thread of the bolt. A simultaneous spring lock is provided as a result of the compressive force on the base 21 through the tongues 23 which produces a reverse spring force on said tongue extremities in threaded engagement with the bolt thread. In addition, an added spring locking force is produced by the compressed spring fingers 35 which exert a constant outward spring force on the adjacent face of the nut N to produce a frictional thread lock of the thread surfaces in the nut N with the mated thread surfaces on the bolt B.

The shell or cage in either form of the invention preferably is constructed of relatively thin sheet metal the thickness of which is selected according to service requirements and the predetermined size of the bolt and nut employed. The shell or cage is most effective when provided of spring metal suitably tempered and otherwise treated to give the desired toughness and hardness. A relatively cheaper construction in accordince with the invention may be provided from cold rolled metal such as cold rolled steel which is untempered but of a spring metal nature and capable of providing an effective and reliable fastening device, as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastening device comprising a nut and a cage comprising a piece of sheet metal bent to define a base overlying and in contact with the top of said nut and carrying locking tongues provided with spaced extremities in line with the thread opening in the nut and lying wholly without the projected surfaces of said nut threads and thereby being adapted to have an initial free running threaded engagement with the thread of a bolt passing through said nut, a pair of arms extending from said base along opposite sides of said nut and inturned flanges extended from said arms under the bottom of said nut, said arms being of greater height than the nut such that the nut is movable between said base and said inturned flanges, said inturned flanges being provided with upwardly bent resilient fingers engaging the bottom of said nut and supporting the nut in said cage in contact with said base whereby the extremities of said locking tongues are initially in phase with the thread of the nut and the bottom of said nut is in yieldable spaced relation to said inturned flanges, said nut being adapted to move relatively to and away from said locking tongues when said bolt is tightened therewith such that the extremities of said tongues are out of phase with the thread of the nut and thereby enter into binding threaded engagement with the said bolt, said upwardly bent resilient fingers being adapted to be compressed by the bottom of the nut when said bolt is tightened therewith to provide a constant upward spring force on said nut producing a frictional thread lock of the thread surfaces in the nut with the mated thread surfaces on said bolt, said frictional thread lock and said binding threaded engagement of said locking tongues with the bolt thread cooperating in a double lock on the coupled nut and bolt in tightened fastening position.

2. A fastening device in accordance with claim 1 wherein the inturned flanges on the cage are provided with outwardly extending hooks for attaching the fastening device in an opening in a supporting part.

References Cited in the file of this patent

UNITED STATES PATENTS

| Number | Name | Date |
|---|---|---|
| 826,591 | Mohr | July 24, 1906 |
| 1,706,820 | Reck | Mar. 26, 1929 |
| 2,079,918 | Mitchel | May 11, 1937 |
| 2,495,037 | Tinnerman | Jan. 17, 1950 |
| 2,627,294 | Bedford | Feb. 3, 1953 |